Aug. 3, 1948.  G. H. AKLIN  2,446,402
CAMERA LENS
Filed Sept. 21, 1946

| EF = 100 mm. | | | | f/3.5 |
|---|---|---|---|---|
| LENS | $N_D$ | V | RADII | THICKNESSES |
| I | 1.734 | 51.1 | $R_1$ = + 33.33 mm | $t_1$ = 6.20 mm. |
|   |       |      | $R_2$ = +163.7     | $S_1$ = 5.48 |
| II | 1.673 | 32.2 | $R_3$ = −94.34    | $t_2$ = 3.70 |
|   |       |      | $R_4$ = +34.29    | $S_2$ = 7.20 |
| III | 1.804 | 41.8 | $R_5$ = +127.71  | $t_3$ = 7.04 |
|   |       |      | $R_6$ = −32.68    | $S_3$ = 1.27 |
| IV | 1.621 | 36.2 | $R_7$ = −30.53    | $t_4$ = 2.00 |
|   |       |      | $R_8$ = −111.12   | BF = 78.26 |

| EF = 100 mm. | | | | f/3.5 |
|---|---|---|---|---|
| LENS | $N_D$ | V | RADII | THICKNESSES |
| I | 1.734 | 51.1 | $R_1$ = + 34.16 mm | $t_1$ = 6.08 mm. |
|   |       |      | $R_2$ = +182.31    | $S_1$ = 5.46 |
| II | 1.673 | 32.2 | $R_3$ = −115.23   | $t_2$ = 3.70 |
|   |       |      | $R_4$ = + 32.48   | $S_2$ = 7.20 |
| III | 1.804 | 41.8 | $R_5$ = +130.68  | $t_3$ = 7.05 |
|   |       |      | $R_6$ = − 32.91   | $t_4$ = 1.99 |
| IV | 1.617 | 36.6 | $R_8$ = −129.47   | BF = 80.88 |

George H. Aklin
INVENTOR
BY
ATTY & AGT.

Patented Aug. 3, 1948

2,446,402

UNITED STATES PATENT OFFICE 2,446,402

CAMERA LENS

George H. Aklin, Rochester, N. Y., assignor to Eastman Kodak Company, Rochester, N. Y., a corporation of New Jersey Application September 21, 1946, Serial No. 698,552

4 Claims. (Cl. 88—57)

This invention relates to camera lenses.

An object of the invention is to provide an improved four-element objective for photographic purposes.

Objectives consisting of two positive and two negative elements are widely known and are considered the most practical objectives for many purposes. Additional elements may improve the image somewhat, but under the economic law of diminishing returns their cost is often not justified. Hence a very urgent demand exists for the best possible four-element objective covering a moderate field angle of 22° to 28° from the axis and any refinement of existing types which improves the correction of one aberration without worsening the others is an important contribution to the art.

One known but not common arrangement is such that the four elements alternate in sign from a positive element at the front to a negative one in the rear, the two rear elements being cemented together in some cases and airspaced in others. Before reflection-reducing coatings were widely used, the advantage of cementing these two elements so as to reduce reflections was more important than it is today.

One embodiment of the invention is particularly suitable for use in camera arrangements such as described in patent application Serial No. 698,518, filed concurrently herewith, and in Serial Number 620,806, filed October 6, 1945, by D. L. Wood and G. Silberstein.

According to the present invention, a camera objective is made up of the type consisting of four lens elements alternating in sign from a positive element in front to a negative element in the rear, and in which all the usual aberrations are corrected to a high degree, and the zonal astigmatism and oblique spherical aberration are very highly corrected so as to produce a sharp image throughout a field of 28° from the axis, or alternatively a sharper image than heretofore possible over some smaller field such as 24°.

This high degree of correction is obtained by the use of high index glasses in the positive elements relative to those in the negative elements, and by a specific combination of the dioptric powers of the lens elements which is best described with reference to the accompanying drawing in which.

Figure 1:
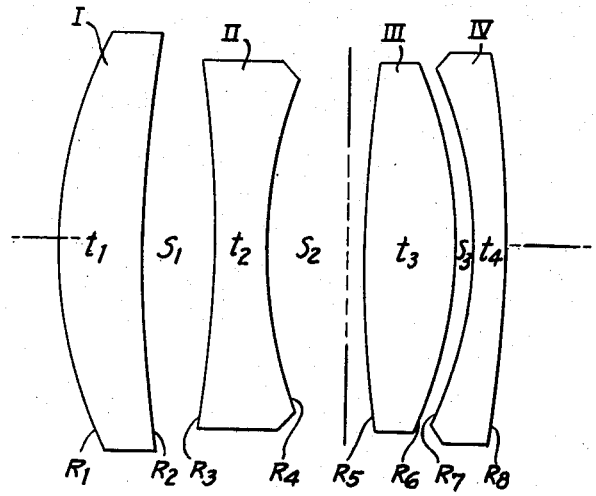
Fig. 1 and Fig. 2 show objectives according to two forms of the invention and constructional data for one embodiment of each.
Figure 2:
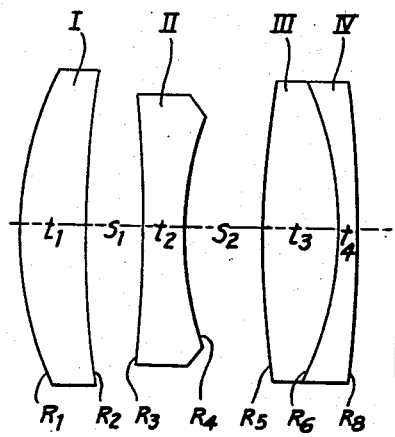

In Fig. 1 the four lens elements which make up the objective are airspaced. In Fig. 2, on the other hand, the two rear elements are cemented together. Each of the two forms of construction has special advantages under different conditions of use, that of Fig. 1 being especially suitable for use in the camera arrangements described in the copending patents already referred to.

The data given in the drawing is repeated in the following tables and pertains in each case to an objective with a focal length of 100 mm.

Example 1  Fig. 1  f/3.5

| Lens | $N_D$ | V | Radii | Thickness |
|---|---|---|---|---|
| I | 1.734 | 51.1 | $R_1 = +33.33$ mm.<br>$R_2 = +163.7$ | $t_1 = 6.20$ mm.<br>$s_1 = 5.48$ |
| II | 1.673 | 32.2 | $R_3 = -94.34$<br>$R_4 = +34.29$ | $t_2 = 3.70$<br>$s_2 = 7.20$ |
| III | 1.804 | 41.8 | $R_5 = +127.71$<br>$R_6 = -32.68$ | $t_3 = 7.04$<br>$s_3 = 1.27$ |
| IV | 1.621 | 36.2 | $R_7 = -30.53$<br>$R_8 = -111.12$ | $t_4 = 2.00$<br>BF $= 78.26$ |

Example 2  Fig. 2  f/3.5

| Lens | $N_D$ | V | Radii | Thicknesses |
|---|---|---|---|---|
| I | 1.734 | 51.1 | $R_1 = +34.16$ mm.<br>$R_2 = +182.31$ | $t_1 = 6.08$ mm.<br>$s_1 = 5.46$ |
| II | 1.673 | 32.2 | $R_3 = -115.23$<br>$R_4 = +32.48$ | $t_2 = 3.70$<br>$s_2 = 7.20$ |
| III | 1.804 | 41.8 | $R_5 = +130.68$<br>$R_6 = -32.91$ | $t_3 = 7.05$<br>cemented |
| IV | 1.617 | 36.6 | $R_7 = R_6$<br>$R_8 = -129.47$ | $t_4 = 1.99$<br>BF $= 80.88$ |

In these tables, as in the drawings, the lens elements are numbered by Roman numerals from front to rear, and the corresponding refractive indices $N_D$ for the D line of the spectrum and dispersive indices V are given in the first three columns. The radii of curvature R of the front and rear surfaces of the four lens elements, the thicknesses t and the spacings s, each numbered by subscripts from front to rear, are given in the last two columns. The value $R_7$ is omitted from Fig. 2 of the drawing without ambiguity because of its obvious equality to $R_6$. The + and − values of R indicate surfaces respectively convex and concave to the front.

Figure 3:
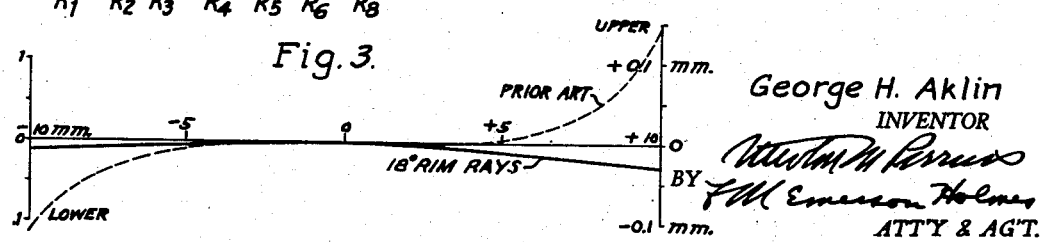
Fig. 3 is included to show the vast improvement in rim ray correction.

Fig. 3 shows the 18° rim ray curve (solid) for the lens of Fig. 1 compared with the corresponding curve (broken) for the best prior art. These curves pertain to rays in the axial plane striking the front of the lens from an angle of 18° below the axis. The abscissae are the heights at which the rays strike a vertical plane in front of the objective, and the ordinates are the heights at which they strike the focal plane, measured from the principal ray in each case. An extremely high degree of rim ray correction is shown by the fact that the rays all intersect the focal plane within a space of 0.04 mm. The other aberrations of the objective are also all reduced by the invention, but it is this rim ray correction that is really spectacular.

I have discovered that the advantages of the invention are best realized by keeping within the limits specified by the following algebraic relationships:

$1.65 < (N_2+.05) < N_1 < 1.95$ $1.68 < N_3 < 1.95$ $0.14 < (N_3-N_4) < 0.35$ $0.56 V_1 < V_2 < 0.72 V_1$ $0.75 V_3 < V_4 < 0.95 V_3$ $4.5 < F\left(\frac{1}{f_1}+\frac{1}{f_3}\right) < 4.9$ $3.9 < -F\left(\frac{1}{f_2}+\frac{1}{f_4}\right) < 4.3$ $1.25F < +R_2 < \infty$ $0.28F < +R_4 < 0.50F$ $0.28F < -R_6 < 0.50F$ $0.28F < -R_7 < 0.50F$ where F is the focal length of the objective and $f_1$ to $f_4$ are the focal lengths of the lens elements numbered from front to rear.

It is preferable also that $R_7$ be between $0.9R_6$ and $1.1R_6$.

The powers of the elements are generally weaker than has heretofore been the rule in corrected photographic lenses. Their numerical values are as follows:

|  | Example 1 | Example 2 |
|---|---|---|
| $F/f_1$ | +1.789 | +1.774 |
| $F/f_2$ | −2.707 | −2.678 |
| $F/f_3$ | +3.029 | +3.001 |
| $F/f_4$ | −1.489 | −1.390 |
| $F\left(\frac{1}{f_1}+\frac{1}{f_3}\right)$ | +4.818 | +4.775 |
| $F\left(\frac{1}{f_2}+\frac{1}{f_4}\right)$ | −4.196 | −4.068 |

This feature cooperates with the particular combination of indices to give the superior correction of astigmatism which is an outstanding advantage of obectives according to the invention.

The preferred shapes of the elements are indicated by specifying one curve of each element.

The thicknesses and spacings are not considered critical and in general are as dictated by well known practical considerations, except that it is preferred that the two rear elements be closer together than any other pair of elements, and, of course, they are cemented together in one form of the invention. Practical considerations have led to assigning an axial thickness of between 0.04F and 0.10F to the positive elements and between 0.01F and 0.05F to the negative elements, but as mentioned before these values are not critical. Also it is preferable that the front two airspaces, $s_1$ and $s_2$, each be between 0.04F and 0.11F, and that $s_1$ be smaller than $s_2$.

Example 2 was designed to cover the maximum field that can be covered assuming a tolerance of +0.2 mm. to −0.7 mm. on the tangential and sagittal field curvature at all angles. The field covered under these conditions is 27°, and the tolerances are not greatly exceeded at 28°.

In Example 1 slightly closer tolerances are held over a smaller field, namely 24°, and by taking advantage of the additional degree of freedom provided by the third airspace, the oblique spherical aberration is so highly corrected that at an obliquity of 18° all meridional rays aimed at an entrance pupil 20 mm. in diameter across the image plane within an interval of 0.04 mm., and the great majority of them are concentrated within 0.015 mm. This is brought out clearly in Fig. 3.

In addition to the improvement in the field curvature, the zonal spherical aberration is noticeably improved.

What I claim and desire to secure by Letters Patent of the United States is:

1. A photographic objective consisting of four lens elements, of which the last two are the closest together, in which the refractive indices N, the dispersive indices V, the focal length f of the lens elements and the radii of curvature R of the front and rear surfaces of the respective lens elements, each numbered by subscripts in order from front to rear, are within the limits specified in the following algebraic relationships:

$1.65 < (N_2+.05) < N_1 < 1.95$ $1.68 < N_3 < 1.95$ $0.14 < (N_3-N_4) < 0.35$ $0.56 V_1 < V_2 < 0.72 V_1$ $0.75 V_3 < V_4 < 0.95 V_3$ $4.5 < F\left(\frac{1}{f_1}+\frac{1}{f_3}\right) < 4.9$ $3.9 < -F\left(\frac{1}{f_2}+\frac{1}{f_4}\right) < 4.3$ $1.25F < +R_2 < \infty$ $0.28F < +R_4 < 0.50F$ $0.28F < -R_6 < 0.50F$ $0.28F < -R_7 < 0.50F$ where F is the focal length of the objective and the + and − values of radii indicate surfaces respectively convex and concave toward the front.

2. An objective as claimed in claim 1 in which $R_6$ and $R_7$ are equal and the rear two elements are cemented together.

3. An objective as claimed in claim 1 in which $R_7$ is between $0.9R_6$ and $1.1R_6$.

4. An objective as claimed in claim 1 made substantially according to the following specifications:

| N | V | Radii | Thicknesses |
|---|---|---|---|
| 1.73 | 51 | $R_1=+0.33F$ | $t_1=0.06F$ |
|  |  | $R_2=+1.6F$ | $s_1=0.05F$ |
| 1.67 | 32 | $R_3=-0.94F$ | $t_2=0.04F$ |
|  |  | $R_4=+0.34F$ | $s_2=0.07F$ |
| 1.80 | 42 | $R_5=+1.3F$ | $t_3=0.07F$ |
|  |  | $R_6=-0.33F$ | $s_3=0.01F$ |
| 1.62 | 36 | $R_7=-0.31F$ | $t_4=0.02F$ |
|  |  | $R_8=-1.1F$ |  | where $t$ and $s$ denote the thicknesses of the lens elements and the spaces between the lens elements each numbered by subscripts from front to rear.

GEORGE H. AKLIN.

REFERENCES CITED

The following references are of record in the file of this patent:

UNITED STATES PATENTS

| Number | Name | Date |
|---|---|---|
| 912,352 | Zschokke | Feb. 16, 1909 |
| 1,168,873 | Florian | Jan. 18, 1916 |
| 2,158,178 | Frederick et al. | May 16, 1939 |
| 2,165,328 | Aklin et al. | July 11, 1939 |

FOREIGN PATENTS

| Number | Country | Date |
|---|---|---|
| 209,371 | Great Britain | Jan. 10, 1924 |